Feb. 20, 1923.
1,446,214.
C. V. SCHLOPIA.
SELF LOCKING CHAIN TIGHTENER.
FILED APR. 17, 1922.
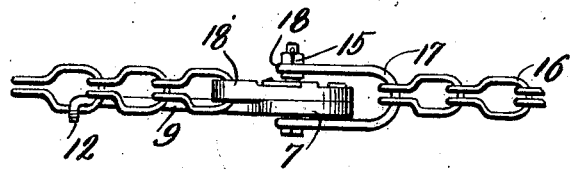
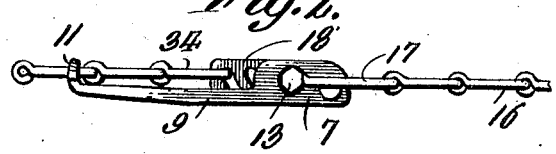
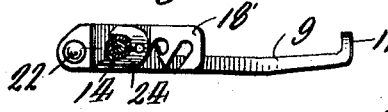
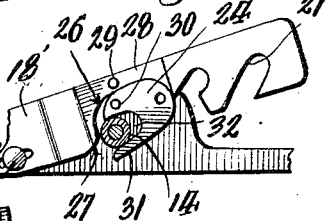
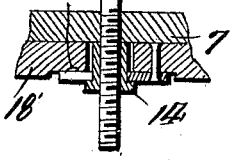
WITNESSES
Inventor
Clifford V. Schlopia
By Richard B. Owen
Attorney Patented Feb. 20, 1923.

1,446,214

UNITED STATES PATENT OFFICE.

CLIFFORD V. SCHLOPIA, OF BENTON, IOWA.

SELF-LOCKING CHAIN TIGHTENER.

Application filed April 17, 1922. Serial No. 553,399.

*To all whom it may concern:*

Be it known that I, CLIFFORD V. SCHLOPIA, a citizen of the United States, residing at Benton, in the county of Ringgold and State of Iowa, have invented certain new and useful Improvements in a Self-Locking Chain Tightener, of which the following is a specification.

This invention relates to new and useful improvements in chain tighteners such as are used in fastening the ends of a chain together, and has for its primary object the provision of clamping means designed to prevent accidental displacement of the end links, of the chain.

Another important object of the invention resides in the provision of a chain fastener having means associated therewith which will be automatically moved when the end of a chain is being associated with the fastener whereby the end of the chain will be locked in engagement with the fastener by said automatic means.

A further object of the invention is to provide the fastener with an automatically operated spring detent which will be moved to a locked position upon the association with an end of a chain with the fastener and which will be released when sufficient force is brought to bear thereon when the chain is being removed therefrom.

Other objects and advantages of the invention will become apparent during the course of the following description.

In the accompanying drawings forming a part of the description and wherein like numerals are employed to designate like parts throughout the several views, Figure 1 is a top plan of the fastener embodying my invention, Figure 2 is a side elevation thereof, Figure 3 is a longitudinal section through the fastener, Figure 4 is a side elevation of the fastener illustrated in an open position, Figure 5 is a transverse section through a portion of the fastener showing the self locking feature, and Figure 6 is an enlarged fragmentary side elevation of the fastener, a part of which is shown in section to illustrate the manner in which the self locking means is automatically moved.

In the drawing wherein for the purpose of illustration is shown the embodiment of my invention which is at present preferred, the numeral 7 designates a substantially flat plate constituting a part of the fastener and which is reduced a substantial distance as at 8 at one end to form an elongated shank 9. This shank is arranged in the same plane with the plate and its free end is bent first upwardly as at 10, then laterally of the plane of the plate 7 and shank 9 to terminate in a downwardly projecting end 11 to form the free end of the shank 9 with a link engaging hook 12.

A bolt 13 is extended transversely through the plate 7 adjacent the shoulder thereof formed by reducing one end thereof, and it is to be particularly noted that the bolt is elongated so that opposite ends thereof are arranged upon opposite sides of the plate 7. A sleeve 14 is positioned upon the end of the bolt opposite the head and urged into engagement with the side of the plate 7 by a nut 15 threaded upon the bolt. One end of the chain 16 is equipped with a U-shaped link 17, the free ends of which are looped as at 18 to be received upon the bolt, it being noted that one of these loops is arranged between the head of the bolt and one side of the plate 7, while the other loop of the link is disposed between the sleeve 14 and nut 15. By the provision of the bolt and sleeve it will be seen that the plate 7 is equipped with a laterally projecting element, the purpose of which will become obvious presently.

The other part of the fastener consists of a flat plate 18 which is about half again as long as the body portion of the plate 7 so that the forward end 19 of the plate 18 extends forwardly of the shoulder 20 formed on the plate 7 at its juncture with shank 9. The forward end of the plate 18 has its relative lower edge provided with one or more forwardly inclined notches 21, the open ends of which are closed by the shank of the plate 7 and the shoulder of this plate when the fastener is arranged in a closed position.

The two plates 7 and 18 are pivotally connected together at their rear ends by a pin or rivet 22. The opening 23 in the plate 18 which receives this pivot pin assumes the form of a slot 23 which extends parallel to the longitudinal dimension of the plate 18. It will therefore be seen that the co-acting plates have relative movements both laterally and longitudinally of one another.

It will be appreciated that the shank 9 and shoulder 20 of the plate 7 will close the open ends of the notches or recesses 21 in the plate 18 when the latter is disposed in closed position alongside the plate 7, and in order to retain the two plates in this co-operative relationship so as to prevent accidental displacement of the links from the notches 21, a retainer member 24 is pivotally connected to the relative outer side of the plate 18 adjacent its intermediate portion. The pivot 25 of this retainer member is also located in the plate 18 adjacent the relative forward end of the bottom of a recess or pocket 26 having its mouth opening into the lower edge of the plate 18 directly in rear of the notches 21. The nose 27 provided at the juncture of the rear end of the notch 26 and the lower edge of the plate 18 is rounded as clearly seen in Fig. 6 for engagement with the sleeve 14 when the plate 18 is being closed so that the plate 18 will be moved slightly rearwardly relative to its co-acting plate 7 whereby the sleeve 14 is permitted to enter the recess 26.

It is preferable to provide the relative outer face or side of the plate 18 with a recess 28 for pivoting the retainer member therein, so that its outer face will be arranged approximately flush with the outer face of the plate 18. The bottom of this recess 28 adjacent the relative top edge of the plate 18 is provided with a depression 29 for a purpose which will presently appear.

The retainer member 24 is of substantially crescent shape so as to be equipped with a pair of spaced fingers or projections 30 and 31 whereby a pocket or recess 32 is provided in the retainer member. This member is pivotally connected to the plate 18 adjacent its outer convex edge as clearly shown. The relative inner face of the finger 30 is provided with an inwardly extending tit or projection 33 adapted to be received in the recess or depression 29 when the retainer member is disposed in a locked position. When in such position, the finger 31 of the retainer member is disposed across the mouth or open end of the recess 26 to retain the sleeve 14 therein. The relative upper finger 30 which I will designate for the purpose of distinction, the closing finger, is adapted to extend in the path of movement of the sleeve 14 so that as the latter enters the recess 26, it will abut the finger 30 and cause the retainer member to pivot so that its finger 31 will close the open end of the recess 26. The finger 31 may be designated as the retainer member opening finger, in view of the fact that the retainer member is caused to pivot when the plate 18 is swung open by the finger 31 engaging the sleeve 14.

In use, the fastener as a whole is carried by one end of a chain 16 such as a side chain of an anti-skid device for automobile wheels, and after the chain has been properly associated with the wheel, a link 34 of the opposite end of the chain 16 is passed up into one of the notches 21 in the plate 18 after which the plate is pressed toward the hook of the plate 7 whereby it is caused to pivot on the pin 22. As the plate 18 pivots, its nose 27 engages the sleeve 14 and causes the plate 18 to shift slightly rearwardly so as to guide the sleeve into the open mouth of the recess 26, and between the two fingers of the retainer member 24. As the plate 18 is closed further, the closing finger 30 of the retainer member is caused to engage the sleeve 14 whereupon the retainer member will begin to pivot so as to cause its closing finger 31 to move upwardly of the recess 26 to close the mouth thereof to position the sleeve 14 within the recess 26 and between the fingers of the retainer member. When the retainer member has been swung upon its pivot a sufficient extent by its abutment with the sleeve 14, the projection 33 on the closing finger 30 snaps into the depression 29 in the plate 18 so as to releasably retain the retainer member in a position to hold the sleeve 14 in the recess and to establish interlocking means between the two plates 7 and 18 so that their accidental pivotal movement is absolutely prevented and the link 34 will be retained in engagement with the fastener until the latter is manually operated to release the same.

By reason of the fact that the retainer member 24 or its detent interlocks with the plate 18 it will be appreciated that these two elements may themselves provide an effective fastener or chain tightener without being used in conjunction with the plate 7. When the plate 18 is used in this capacity the detent or retainer member can either be operated manually or can be forced to open or closed position by causing the links to be connected to the plate to engage the fingers 30 and 31 in a manner similar to the way they engage the sleeve 14 explained heretofore.

The foregoing description and the accompanying drawings have reference to the preferred or improved embodiments of my invention. It is to be understood however, that such changes may be made in construction and arrangement of parts, materials, dimensions, etc., as may prove expedient and fall within the scope of the appended claims.

Having thus described and illustrated my invention, which I claim is:—

1. A chain connector comprising a body portion having a link receiving pocket therein, a retainer member pivoted to the body portion and having a portion thereof extending into the path of movement of a link entering said pocket when the retainer member is in an open position, said retainer member having a finger adapted to be moved by the link engaging said retainer member to close the open mouth of the pocket when the link has entered the same, and interlocking means between the retainer and the body portion operative when the retainer member is in a closed position.

2. A connector comprising a body portion having a link receiving pocket therein, a retainer member pivotally connected to the body portion and having a pair of spaced fingers between which the link is adapted to be received, one of said fingers being adapted to extend into the path of movement of the link entering said pocket when the retainer member is in open position, the other finger being adapted to be moved by the link engaging the first named finger to close the open mouth of the pocket, and interlocking means between the retainer member and said body portion operative when the retainer is in a closed position.

3. A chain connector comprising a pair of plates pivotally connected together and having co-operative link receiving pockets, one of said plates having a recess, the co-acting plate being equipped with a projection adapted to enter said recess when the plates are closed, and a retainer member carried by the plate having the recess adapted to be moved by the projection of the co-operating plate to close said recess and retain the projection therein to prevent accidental pivotal movement of the two plates.

4. A chain fastener comprising a pair of plates pivotally and slidably connected together and having co-operative link receiving pockets, one of said plates being equipped with a recess, the co-acting plate being provided with a projection adapted to be received in said recess when the plates are arranged in a closed position, said projection being adapted to abut the plate having the pocket to slide the same relative to the other plate whereby the projection can enter said recess, and a retainer member pivoted to the plate having the recess therein and adapted to be operated by engagement with the projection to either close the open end of the recess and prevent accidental displacement of the projection therefrom, or to be moved to a position to permit exit of the projection from the recess when the co-operative plates are moved to open position.

In testimony whereof I affix my signature in presence of two witnesses.

CLIFFORD V. SCHLOPIA.

Witnesses:
L. C. QUUIETT,
JOE GOFF.